Figure 1:
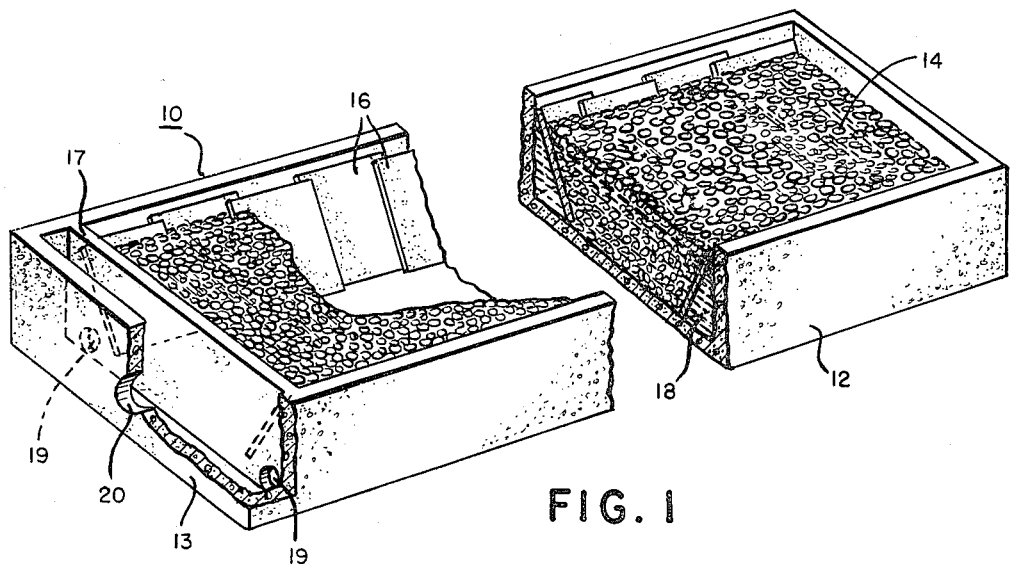

May 10, 1966 M. R. MURRAY 3,250,606

NUTRIENT SEA-SOLIDS SOLUTION FOR HYDROPONIC FARMING

Original Filed Oct. 8, 1962

INVENTOR.
MAYNARD R. MURRAY

BY *Lazo & Barry*

ATTORNEYS

United States Patent Office 3,250,606
Patented May 10, 1966

3,250,606
NUTRIENT SEA-SOLIDS SOLUTION FOR HYDROPONIC FARMING
Maynard R. Murray, Wilmette, Ill., assignor of four-tenths to Hans A. Eggerss, Milwaukee, Wis.
Continuation of application Ser. No. 229,067, Oct. 8, 1962. This application Feb. 24, 1965, Ser. No. 439,129
The portion of the term of the patent subsequent to Jan. 1, 1980, has been disclaimed
4 Claims. (Cl. 71—1)

This invention is a continuation of application S.N. 229,067, entitled "Nutrient Solution for Hydroponic Farming," filed October 8, 1962, now abandoned, by the present inventor, said application S.N. 229,067 being a continuation-in-part of application S.N. 739,463 entitled "Process of Applying Sea Solids as Fertilizer," filed June 3, 1958, by the present inventor (now Patent 3,071,457, issued January 1, 1963).

This invention relates to hydroponics—the cultivation of land plants using solutions of inorganic salts instead as nutrient. More particularly, it relates to a novel nutrient solution and method for hydroponic farming.

Broadly, the present invention provides a novel method having utility for growing land plants hydroponically, which comprises supplying to seeds and/or seedlings and to the growing plants thereafter, elements which are necessary for plant growth dissolved in water in substantially the exact proportion and balance, i.e., ratio, as those elements are found as dissolved solids in sea water.

Heretofore, water solutions containing various proportions of potassium, phosphorus, and nitrogen, together with traces or iron, boron, zinc, copper, calcium, sulfur, magnesium and manganese, have been used for growing various types of flowers and vegetables in hydroponic beds. Generally, no earth is used with hydroponic farming, the growing plants being supported where necessary by mechanical means, such as wires and frames upon which the growing plant can climb. Washed gravel or other inert granular material is usually employed to provide a foundation for the root system for the particular plane being grown. In many instances, the plant will require no additional support during its growing season.

It is known that the structure and functions of all plants are a matter of chemistry. When a seed is planted in the soil, its first cell divisions are dependent on the outside environment only for moisture. After the seed sprouts, the chemical building of the plant is totally dependent on the outside environment. Naturally, the plant can be built only of the nutritional elements which are available to it. The source of such elements is the soil in which the seed has been planted. Further, all of the elements must be in the inorganic or salt form, suspended or dissolved in water, before the plant can utilize them. If certain elements are not in the soil, or are not in a form available to the plant, the grown plant will have a different chemistry than if all of the elements it could use as chemical building blocks were present.

It is now known that one of the basic problems of growing food in the soil stems from the fact that plants can take from the soil only those elements which are there and which are present in the right combination, i.e., balance and proportion. Unless all the "necessary" elements are in the soil in the first place, or are somehow provided to it, the plant will be deficient in those missing elements. Animals and human beings eating the same plants as food will lack these elements, some of which may be very essential to the diet. Much food has been grown which looks attractive and fresh and is found to be tender and delicious to the taste, but still lacks certain essential nutritive benefits. In an effort to assure that minerals known to be essential to certain crops are supplied to the growing plants, more and more attention has been directed to the desirability of growing food crops hydroponically.

The principle of hydroponic farming is based upon the knowledge that essential elements for plant growth must be supplied to the growing plant in a chemical form available for use by the plant, for example, in the form of dissolved compounds of various types present in the water supplied to the plants. Accordingly, conventional hydroponic nutrient solutions have usually contained various proportions of the major ash elements generally found in all plants—potassium, phosphorus, calcium, sulfur, magnesium, boron, sodium, and chlorine. Sometimes traces or iron, zinc and copper have been included. Recently the extreme importance of including trace elements in common fertilizers for soil farming has been realized. Though they play a small role—quantity wise—in the chemical structure of the living plant organism, many of these elements already have been found to be essential to the growth of certain crops.

It has now been discovered that most effective nourishment can be provided to plants growing in hydroponic beds by supplying elements which are necessary for growth as dissolved inorganic salts in water, each in a predetermined ratio relationship. Surprisingly, this is accomplished by making up a nutrient solution of those elements in substantially the exact ratio with respect to each other as the particular elements are found as dissolved solids in sea water. All of the essential nutrients can be supplied to effect complete nourishment using a single nutrient solution comprising diluted sea water. Preferably, such nutrient solutions are obtained by dissolving complete sea-solids in fresh water to form dilute solutions containing about from 1000 to 8000 parts per million of sea-solids.

Figure 2:
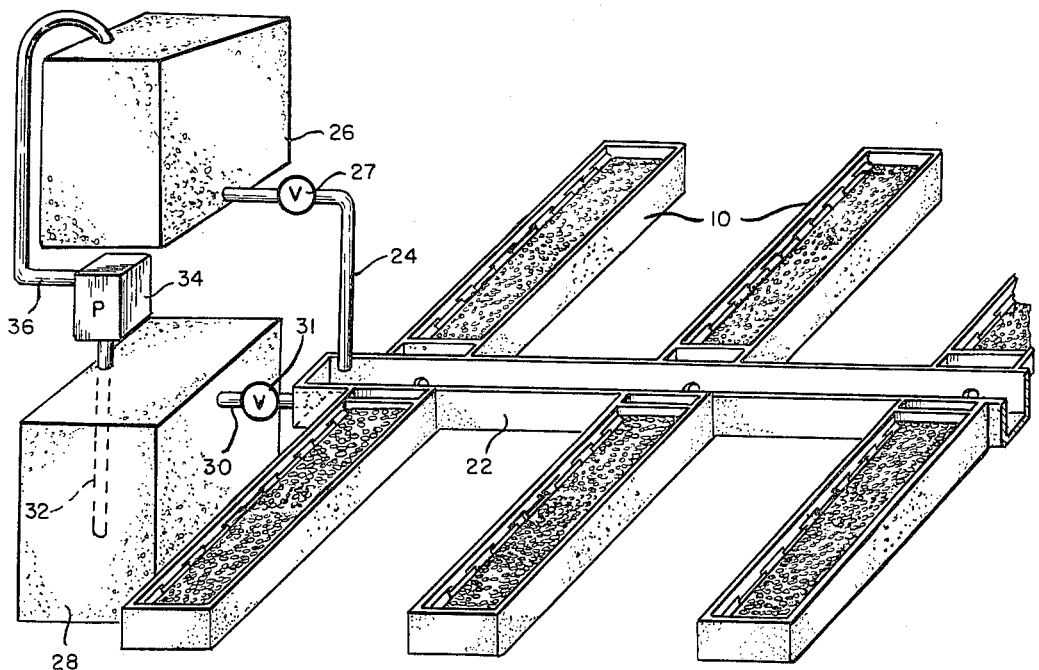

The novel features which are believed to be characteristic of the invention, both as to its organization and the method of operation, together with further objects and advantages thereof, will be understood more clearly and fully from the following description when considered in connection with the accompanying drawing in which:

FIGURE 1 is a perspective view of a hydroponic bed for growing crops in a nutrient solution of dissolved sea-solids, in broken section to show only the end portions of a single lond bed; and FIGURE 2 illustrates diagramatically the method of supplying and withdrawing nutrient solution to a series of interconnected hydroponic beds for growing plants such as vegetables, food crops, flowers, or the like.

In most areas it is likely that the soil in which plants are grown at one time contained all of the essential elements, and in the combination most effective for plant growth. But many of these elements were lost over the years whether the land was cultivated or not. Soil loses its fertility in several different ways. Erosion by the wind and the rain has gradually taken various elements from the soil. Rain, which is nature's best solvent, carries with it dissolved and suspended elements when it escapes from the soil. In this instance, it is likely that most of these elements were washed directly into the rivers and then into the sea. Agricultural methods have also complicated the problem. Plants generally remove some 50 elements from the soil in the growing process. Even the very best fertilizing techniques seldom return more than twelve. This means that as many as 38 elements are lost even with modern fertilization methods. When inferior methods are employed, even fewer elements are returned to the soil.

Using hydroponic techniques, selected elements essential for growth can be supplied in suitable form and in controlled quantities. These elements in an aqueous solution are readily available for assimilation by the growing plant. Heretofore, part of the problem has been the difficulty in determining just what element or elements were actually essential for growth of the particular plant involved whether it be a food crop such as vegetables, fruits, and grains, or a crop of flowers, shrubs or trees. Some 60 elements now have been positively identified in plants. More than one-third are conceded to be essential for complete plant or animal nutrition. There are more on the probable list. The bulk of a green plant is composed of a relatively small number of elements. The four energy elements—carbon, hydrogen, oxygen and nitrogen—make up 95% of the dry weight. Most, but not all, of the remaining weight is made up of the major ash elements called the macronutrients. These are phosphorus, potassium, calcium, magnesium, silicon, sodium, sulfur and chlorine. Less than 1% of the total dry weight is accounted for by the trace elements called the micronutrients. Some of these elements, however, which are present in very small quantities are just as essential to growth as those which comprise the greater portion of the plant.

It has now been discovered that all of the essential micronutrients can be supplied to plants hydroponically by growing the plants in dilute solutions of sea water or in aqueous solution of *complete sea-solids*. The sea-solids can be obtained by drying sea water from any ocean. Generally, for economic reasons related to transportation costs, the sea water is dried substantially completely. The end product contains essentially the total weight content of each one of the organic elements originally present as dissolved solids in the sea water evaporated including the original quantity of sodium chloride contained therein, each of the elements being present in substantially the same proportion and balance, i.e., ratio, as the elements are found in untreated liquid sea water.

The table below lists all of the elements known to occur in sea water as dissolved inorganic solids, except hydrogen, oxygen and other dissolved gases. They are not given as ions but as the amount of the individual elements which occur, for example, in water of 19% chlorinity. Cadmium, chromium, cobalt and tin are included because they have been found in the ash of marine organisms, and hence it is implied that they occur in sea water although so far they have not been obtained directly. Each litre of sea water contains approximately 27.32 grams of sodium chloride. Suitable nutrient solutions are prepared by diluting sea water with fresh water, each 1,000 lbs. of nutrient solution containing in the range of about 25–225 lbs. of sea water.

*Table I—Sea solids*

[Parts/million, mg./kg.]

| | |
|---|---|
| Chlorine | 18,980 |
| Sodium | 10,561 |
| Magnesium | 1,272 |
| Sulfur | 884 |
| Calcium | 400 |
| Potassium | 380 |
| Bromine | 65 |
| Carbon | 28 |
| Strontium | 13 |
| Boron | 4.6 |
| Silicon | 0.02–4.0 |
| Fluorine | 1.4 |
| Nitrogen | 0.01–0.7 |
| Aluminum | 0.5 |
| Rubidium | 0.2 |
| Lithium | 0.1 |
| Phosphorus | 0.001–0.10 |
| Barium | 0.05 |
| Iodine | 0.05 |
| Arsenic | 0.01–0.02 |
| Iron | 0.002 |
| Manganese | 0.001–0.01 |
| Copper | 0.001–0.01 |
| Zinc | 0.005 |

*Table I—Sea solids*—Continued

[Parts/million, mg./kg.]

| | |
|---|---|
| Lead | 0.004 |
| Selenium | 0.004 |
| Cesium | 0.002 |
| Uranium | 0.0015 |
| Molybdenum | 0.0005 |
| Thorium | 0.0005 |
| Cesium | 0.0004 |
| Silver | 0.0003 |
| Vanadium | 0.0003 |
| Lanthanum | 0.0003 |
| Yttrium | 0.0003 |
| Nickel | 0.0001 |
| Scandium | 0.00004 |
| Mercury | 0.00003 |
| Gold | 0.000006 |
| Radium | $0.2-3 \times 10^{-10}$ |
| Cadmium | Tr. |
| Chromium | Tr. |
| Cobalt | Tr. |
| Tin | Tr. |

If desired, conventional nitrogenous fertilizer materials such as potassium and ammonium nitrate, ammonium sulfate, and urea, or the like, can be employed together with the dilute solution of sea solids to provide a nutrient solution containing added nitrogen. These materials are readily soluble in water and aqueous solutions and are representative of the three types of nutrient nitrogen found in the soil; nitrate nitrogen, ammonium nitrogen, and organic nitrogen. In solution, nitrogen is absorbed by plants in the form of ammonium ions and nitrate ions supplied by water-soluble nitrogenous fertilizer materials. All of the inorganic nitrate fertilizers are soluble compounds, such as ammonium nitrate, sodium nitrate, potassium nitrate, calcium nritate and the like, which form nitrate ions when dissolved in aqueous solution. Similarly, ammonium nitrogen, i.e. ammonium ions, are derived from reduced nitrogen fertilizers such as anhydrous ammonia, aqueous ammonia, ammonium phosphate, ammonium nitrate, ammonium sulfate and the like, all of which are soluble in water or aqueous solutions. Of all the organic nitrogen compounds, only the organic reduced nitrogen fertilizers that hydrolyze to provide ammonia, such as urea and cyanamide are soluble to any appreciable extents. Alternatively, nitrogen can be provide indirectly using the organism azatobacter and conventional nitrogen fertilizers are not needed.

In general, any type of multicellular plant life can be grown hydroponically in water containing dissolved sea-solids. This includes fruits, vegetables, berries, common garden plants, tomatoes, as well as grains such as wheat, barley, oats, and the like. The sea-solids can be obtained in abundant supply from naturally occurring sources, for example, where sea water has become trapped in shallow coastal areas and dried to completeness, or it can be manufactured directly by the evaporation of sea water. It is only essential that the entire mineral content of the sea water be retained in the drying process so that the final product contains essentially the total weight content of all the inorganic elements originally present in the sea water evaporated including the original quantity of sodium chloride. Hydroponic solutions can be manufactured in accordance with the instant invention simply by mixing together the various essential elements required as long as they are incorporated into the solution in substantially the same overall ratio as such elements are found in sea water. Preferably, however, due entirely to economic considerations in most instances natural sea-solids will be employed rather than material which has been artificially constituted.

To more fully illustrate the invention the following examples are given. It is understood, however, that the examples presented are for the purpose of illustration only and are not to be construed as limiting in any way the scope of the present invention.

In this illustrative example tomatoes were grown hydroponically in accordance with the method of the instant invention in hydroponic beds similar to the concrete hydroponic bed shown in FIG. 1 and designated generally at 10. The bed 10 of box-like configuration has sidewalls 12 and end walls 13. Hydroponic beds employed in the experiments of this example were 100 feet long, 3 feet wide and 8 inches high. Side and end walls were formed of concrete approximately 3 inches thick and each bed was filled with washed gravel 14 to the level of approximately 7 inches from the bottom. In the embodiment illustrated, inner end wall 17 served to provide an entry chamber for nutrient solution admitted into each bed through feed opening 20. Tile slabs obliquely angled along each side wall in overlapping fashion served to provide open water channels 18 so that nutrient solution easily could be admitted and withdrawn from the entire bed.

FIGURE 2 illustrates a series arrangement for interconnecting a large number of hydroponic beds of the type shown generally in FIGURE 1 for large scale hydroponic farming. In this embodiment a main flume 22 connects each bed 10 whereby nutrient solution can be admitted from a suitable nutrient tank or container 26 through inlet line 24. A valve 27 is provided to control the flow of nutrient solution which in the embodiment shown can be admitted to the beds by gravity feed. Generally, the solution is fed into the bed to a level approximately one inch from the top of the gravel and then withdrawn immediately. Nutrient solution, which for this purpose may be termed "spent" fluid, is withdrawn to return tank 28 again by gravity through outlet line 30 controlled by valve 31. The nutrient solution is thereafter returned to the nutrient tank 26 through lines 32 and 36 by means of a conventional pump 34, where it is replenished by the addition of more sea solids and fresh water as desired.

In one set of experiments, crops of beans, tomatoes and cucumbers were grown in 32 hydroponic beds in accordance with the method illustrated in FIGURE 2. The seeds were sprouted in a dilute solution of aqueous sea-solids and transferred to the large beds as seedlings approximately 4 inches high. Alternatively, the plants can be grown directly from seeds without transplanting. The growing plants were fed twice a day using a nutrient solution made up by dissolving 116 pounds of complete sea-solids in 100,000 pounds of water, i.e., 9.3 lbs./1,000 gal. water. Control water contained 490 p.p.m. of soluble salts. Full production was achieved in about 100 days. Preferably, the concentration of sea solids in the nutrient solution employed should not exceed about 8,000 parts per million (by weight). While some growth can be achieved using more dilute solutions, in general it will be necessary to use solutions of sea-solids containing at least about 1,000 parts per million. Solutions of greater concentrations than about 8,000 parts per million tend to retard the plants in a manner similar to that observed with the over application of conventional fertilizers, and generally should not be employed.

In the manner described above, various crops including wheat, oats, radishes, carrots, turnips, beets, tomatoes, corn, strawberries, onions, and the like, have been grown successfully with nutrient solutions comprising fresh water containing in the range of about 1,000 to 8,000 parts per millon of dissolved complete sea-solids. These results are all the more surprising in view of the comparative experiments which have been made using solutions containing equivalent amounts of sodium chloride only. Here, it was observed, that dissolved sodium chloride solutions are definitely toxic to plants but that solutions of complete sea-solids, even though they contained the same quantity of dissolved sodium chloride, which when used alone was toxic, can be used beneficially as a nutrient solution for the growing plants.

If desired, conventional nitrogenous fertilizer materials and inorganic salts can be employed together with diluted sea water or with a dilute solution of complete sea-solids in conventional concentrations. For example, in similar experiments to the beans, tomatoes and cucumbers experiments described above, about 200 parts per million of potassium nitrate successfully was employed for each 1,000 parts per million of complete sea-solids. Surprisingly, however, direct supplementary nitrogenous fertilizer is not required with sea-solid nutrient solutions as the hydroponic beds can be inoculated with azatobacter which is nourished well in nutrient solutions comprising sea-solids and has the ability to fix sufficient nitrogen out of the air. One method of supplying azatobacter bacteria to the hydroponic beds is to flow the nutrient solution through a bed containing a legume crop such as beans where the nutrient solution can come in contact with the nodules on the roots of the legumes. Alternatively, bean crops, or other legumes can be grown in hydroponic beds interspersed with other beds connected in series so that an adequate supply of azatobacter is assured.

While there are described above a number of specific embodiments of the present invention, it is obviously possible to produce other embodiments in various equivalent modifications and variations thereof without departing from the spirit of the invention or the scope of the appended claims.

What is claimed is:

1. A soiless method of growing a land plant hydroponically which comprises feeding the plant in a hydroponic bed with a liquid nutrient medium consisting of a dilute aqueous solution of soluble salts containing in the range of from 1,000 to 8,000 parts per million of complete sea-solids.

2. A soilless method of growing land plants hydroponically comprising feeding the plants in a hydroponic bed with a liquid nutrient medium consisting essentially of fresh water containing from 1,000 to 8,000 parts per million of dissolved complete sea-solids.

3. A soilless method of growing land plants hydroponically comprising feeding the plants in a hydroponic bed with a liquid nutrient medium consisting essentially of 77.5–97.5 parts fresh water and 2.5–22.5 parts sea water.

4. A nutrient solution for soilless growing of land plants in a hydroponic bed comprising a dilute aqueous solution of soluble salts containing in the range of from 1,000 to 8,000 parts per million of complete sea-solids and a minor but fertilizing amount of a water-soluble nitrogenous material.

References Cited by the Examiner

UNITED STATES PATENTS

| | | | |
|---|---|---|---|
| 2,062,755 | 12/1936 | Lyons et al. | 71—1 |
| 2,270,518 | 1/1942 | Ellis et al. | 71—1 |
| 2,350,982 | 6/1944 | Borst | 71—1 |
| 3,071,457 | 6/1958 | Murray | 71—1 |

DONALL H. SYLVESTER, *Primary Examiner.*

GEORGE W. RUTHERFORD, *Assistant Examiner.*